US012492076B2

(12) United States Patent
Toro et al.

(10) Patent No.: US 12,492,076 B2
(45) Date of Patent: Dec. 9, 2025

(54) CHUTE ARRANGEMENT AND CAP-REMOVAL APPARATUS

(71) Applicant: Roche Diagnostics Operations, Inc., Indianapolis, IN (US)

(72) Inventors: Daniel Gomez Toro, Frankfurt am Main (DE); Marius Kees, Weinheim (DE); Lay-ying Tan, Bayan Lepas Penang (MY); Sabine Benz, Erzhausen (DE)

(73) Assignee: ROCHE DIAGNOSTICS OPERATIONS, INC., Indianapolis, IN (US)

( * ) Notice: Subject to any disclaimer, the term of this patent is extended or adjusted under 35 U.S.C. 154(b) by 98 days.

(21) Appl. No.: 18/631,144

(22) Filed: Apr. 10, 2024

(65) Prior Publication Data

US 2024/0343492 A1    Oct. 17, 2024

(30) Foreign Application Priority Data

Apr. 12, 2023  (EP) .................................... 23167507

(51) Int. Cl.
 *B65G 11/20* (2006.01)
 *B67B 7/00* (2006.01)
 *G01N 35/04* (2006.01)

(52) U.S. Cl.
 CPC .............. *B65G 11/203* (2013.01); *B67B 7/00* (2013.01); *B65G 2203/0241* (2013.01); *G01N 2035/0405* (2013.01)

(58) Field of Classification Search
 CPC .......... B65G 11/203; B65G 2203/0241; B65G 43/08; B65G 11/023; B65G 2201/02; B67B 7/00; G01N 2035/0405; G01N 35/04
 See application file for complete search history.

(56) References Cited

U.S. PATENT DOCUMENTS

| | | | | |
|---|---|---|---|---|
| 5,826,409 A | * | 10/1998 | Slepicka | ................... B67B 7/00 53/492 |
| 6,116,407 A | * | 9/2000 | Zolicoffer | ............... B67B 3/064 198/530 |

(Continued)

FOREIGN PATENT DOCUMENTS

| | | |
|---|---|---|
| EP | 2 909 635 | 8/2015 |
| EP | 3 236 267 | 10/2017 |

(Continued)

OTHER PUBLICATIONS

JP 2020182934-A and translation (Year: 2020).*

*Primary Examiner* — Mark A Deuble
(74) *Attorney, Agent, or Firm* — Woodard, Emhardt, Henry, Reeves & Wagner, LLP

(57) ABSTRACT

The invention relates to a chute arrangement for a cap-removal apparatus, the cap removal apparatus being configured to remove caps from sample containers, the chute arrangement comprising a chute for transporting removed caps through a transport space of the chute arrangement, a sensor for detecting caps passing through a detection range of the sensor, the transport space being partially delimited by a chute bottom of the chute, the chute bottom being inclined with respect to gravity, the detection range protruding into the transport space, the detection range having a range border within the transport space, and the range border facing the chute bottom at a distance so that a bypass portion of the transport space is formed in between the chute bottom and the detection range.

8 Claims, 3 Drawing Sheets

(56) References Cited

U.S. PATENT DOCUMENTS

Figure 1:
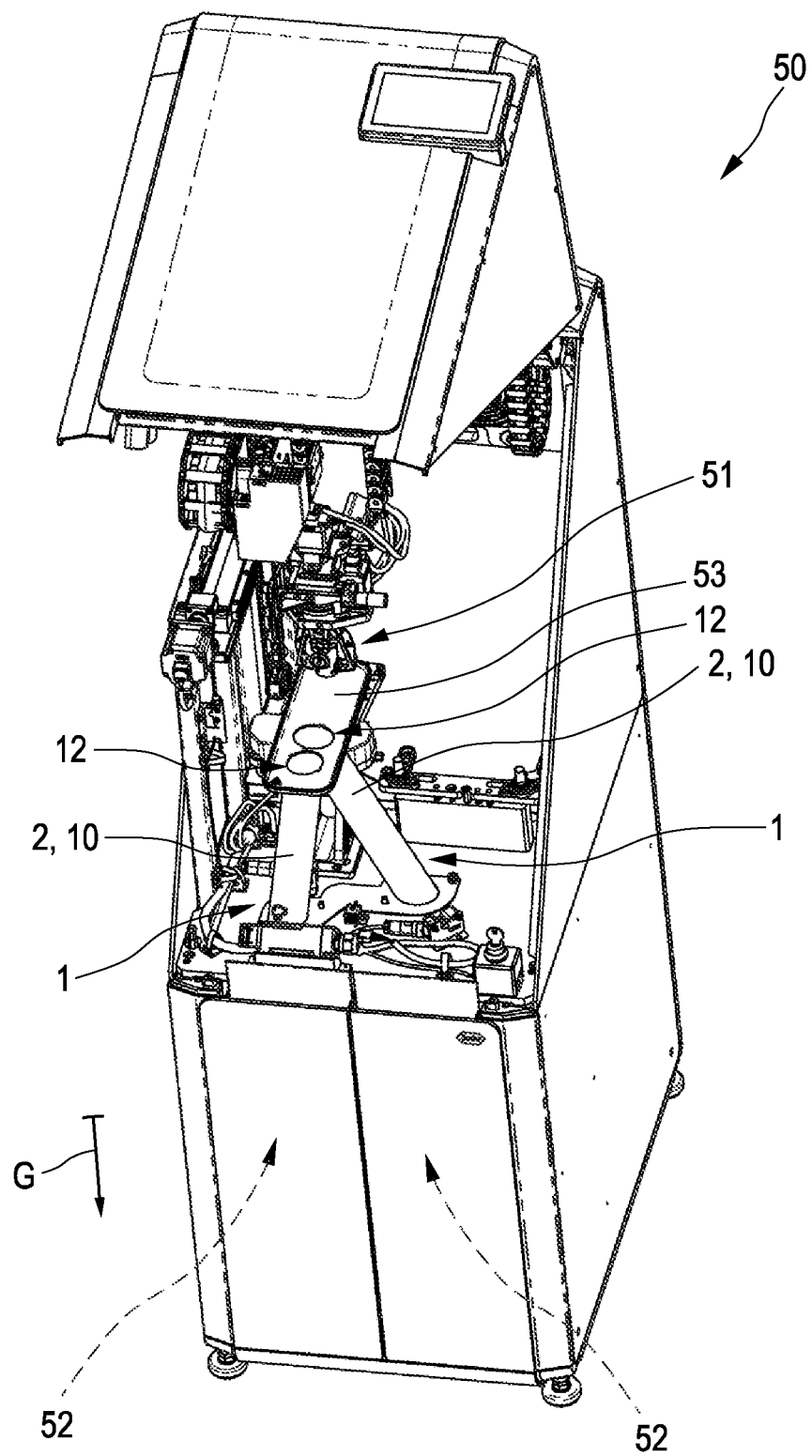

| | | | |
|---|---|---|---|
| 6,202,278 B1 | 3/2001 | Nakayama et al. | |
| 8,220,137 B2 | 7/2012 | Pedrazzinni | |
| 8,474,597 B2 * | 7/2013 | Pier | E01B 29/24 |
| | | | 198/396 |
| 8,528,194 B2 | 9/2013 | Pedrazzini | |
| 9,169,070 B2 * | 10/2015 | Miyashiro | G06M 7/04 |
| 9,725,253 B2 * | 8/2017 | Embley | E05F 15/73 |
| 2003/0103839 A1 | 6/2003 | Osborne et al. | |
| 2024/0034494 A1 * | 2/2024 | Kees | G01N 35/0099 |

FOREIGN PATENT DOCUMENTS

| | | | | |
|---|---|---|---|---|
| EP | 4596482 A1 * | 8/2025 | | B65B 57/04 |
| WO | WO-2012051651 A1 * | 4/2012 | | B65G 11/203 |
| WO | WO 2014/062810 | 4/2014 | | |

* cited by examiner

CHUTE ARRANGEMENT AND CAP-REMOVAL APPARATUS

The invention relates to a chute arrangement for a cap-removal apparatus, the cap-removal apparatus being configured to remove caps from sample containers. Furthermore, the invention relates to such a cap-removal apparatus for removing caps from sample containers.

Commonly, sample containers storing a sample are sealed by a cap. To gain access to an interior of such a sample container and/or to the sample, the cap is to be removed from the sample container. The removal of caps from sample containers can be automated by use of a cap-removal apparatus. Such a cap-removal apparatus often comprises a chute arrangement for transporting removed caps to a waste bin of said cap-removal apparatus.

It is an object of the invention to provide for a chute arrangement for a cap-removal apparatus, the cap-removal apparatus being configured to remove caps from sample containers, and to provide for such a cap-removal apparatus enabling particularly reliable detection of removed caps.

This object is solved by the subject matter of independent claim 1. Preferred embodiments are subject matter of the dependent claims.

The chute arrangement according to the invention is adapted for use in a cap-removal apparatus, the cap-removal apparatus being configured to remove caps from sample containers. The sample container can be a laboratory sample container. The laboratory sample container typically contains a liquid sample, e.g. a blood sample, etc. The chute arrangement comprises a chute for transporting removed caps through a transport space of the chute arrangement. When being transported by the chute, the removed caps can travel through the transport space. At least a part of the transport space may extend along the chute. However, the transport space may extend further than a length of the chute. Thus, the transport space may extend beyond an inlet and/or an outlet of the chute. When being transported by the chute, the removed caps can slide along the chute and through at least a portion of the transport space. Furthermore, the chute arrangement comprises a sensor having a detection range. Therein, the sensor is adapted for detecting caps passing through the detection range. Whenever a cap passing through the detection range is detected or recognized by the sensor, a cap counter of the chute arrangement may be incremented by one counting unit, thus enabling automatic counting of removed caps. The chute has a chute bottom which is inclined with respect to gravity. Therein, the transport space is partially delimited by the chute bottom. The detection range of the sensor protrudes into the transport space. The detection range has a range border within the transport space. In other words: The range border of the detection range is located or positioned within the transport space. Therein, the range border faces the chute bottom at a distance. In other words: In between the range border and the chute bottom a gap is present. Due to the range border facing the chute bottom at a distance, a bypass portion of the transport space is formed in between the chute bottom and the detection range. The bypass portion may correspond to the afore-mentioned gap in between the range border and the chute bottom. In particular, the bypass portion is adapted for liquid led along the chute bottom to bypass the detection range. Thus, liquid or sample portion unintentionally spilled onto the chute when removing a cap from a sample container can be led through the chute without the liquid or sample portion passing the detection range. In this way, any liquid or sample portion led along the chute can be avoided from falsely triggering the sensor. By the detection range and the bypass portion being distinct from one another, a filter-function can be realized, said filter-function allowing for only objects of at least cap-size to be recognized when being transported along the transport space, whereas smaller objects or liquid are at least less probable to intersect with the detection range. Accordingly, a probability of false triggering of the sensor by liquid or objects other than, in particular smaller than, caps may be diminished. Thus, the chute arrangement according to the invention enables particularly reliable detection of removed caps.

According to an embodiment of the invention, the detection range comprises a substantially planar monitoring window. The substantially planar monitoring window extends at an angle with respect to the chute bottom. In addition or as an alternative, the substantially planar monitoring window extends at an angle with respect to gravity. In particular, the substantially planar monitoring window extends horizontally. This allows for a particularly compact chute arrangement.

According to another embodiment of the invention, the chute has a tubular body. The tubular body comprises the chute bottom. The tubular body at least partially surrounds the transport space. The term "at least partially surrounds" therein may take into account, that the tubular body has open endings beyond which the transport space may extend. A cross-sectional area of the tubular body is of elliptical shape. In particular, the cross-sectional area of the tubular body is of lens-like or circular shape. The chute bottom of such a tubular body can be particularly easy to clean. Furthermore, such a tubular body has a particularly well stability and can be cost-efficiently made from tube raw material.

According to another embodiment of the invention, the sensor has a response time of max. 2.9 ms, in particular of max. 1.45 ms. This allows for particularly reliable recognition of removed caps passing the detection range.

According to another embodiment of the invention, the bypass portion has a bypass height. The bypass height is measured perpendicular to both the range border and gravity. Therein, the transport space has a space height, said space height being measured along the bypass height. The bypass height and the space height together can correspond to an inner diameter of the chute, in particular of the tubular body of the chute, said inner diameter being measured along the bypass height and the space height. The bypass height is less than half of the space height. In particular, the bypass height is less than a tenth of the space height. Therein, the bypass height can be more than 4.0 mm and less than 5.0 mm. The bypass height can define a minimum size of caps to be recognized by the sensor when traveling through the transport space.

According to another embodiment of the invention, the sensor has a retroreflective device or a fiber optic sender/receiver or a light barrier device. Such a sensor allows for particularly precise recognition of removed caps and/or can be implemented in a particularly simple way. In addition or as an alternative, the sensor is arranged at an outlet of the chute so that the detection range partially covers the outlet. This allows for particularly good accessibility of the sensor.

The cap-removal apparatus according to the invention is adapted for, in particular automatically, removing caps from sample containers. Therein, the cap-removal apparatus comprises at least one chute arrangement according to the invention as described above. The cap-removal apparatus has a handling device which is adapted for taking caps off sample containers and for delivering removed caps to an inlet of the chute of the at least one chute arrangement.

Furthermore, the cap-removal apparatus comprises a storage container for receiving caps exiting the chute. The storage container can be a waste bin. The afore-mentioned advantages of the chute arrangement according to the invention transfer to the cap-removal apparatus according to the invention due to the latter having the former.

According to an embodiment of the invention, the cap-removal apparatus has two chute arrangements, in particular both chute arrangements being in accordance with the invention. Therein, the handling device of the cap-removal apparatus is adapted to deliver removed caps to the inlet of one of the two chutes of the two chute arrangements, selectively. Each of the chute arrangements is assigned a separate storage container of the cap-removal apparatus, respectively. In particular, the inlet of each chute mouths into a common inlet-collector of the cap-removal apparatus. In particular, the inlet-collector is platter-shaped or plate-shaped. The two chute arrangements can be adapted for transport and recognition of caps having a different size, respectively.

Further advantages and features of the invention arise from the claims as well as from the following description of a preferred embodiment of the invention, which is depicted by the drawings. Therein, equal reference signs relate to equal or similar or functionally equal components.

It is to be understood that the features mentioned above as well as the features described below are not only usable in the stated combination, respectively, but also in other combinations or solely, without leaving the frame of the present invention.

Figure 2:
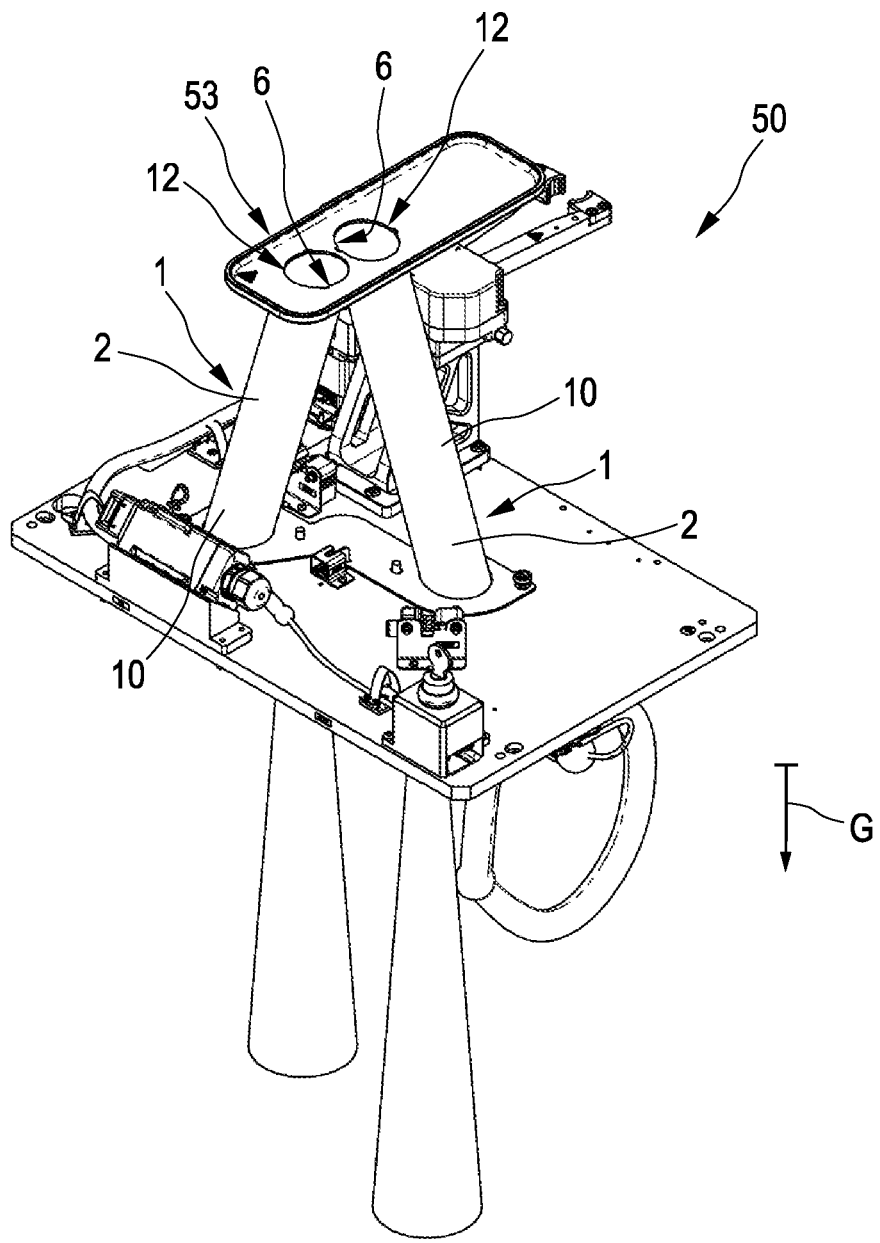
Figure 3:
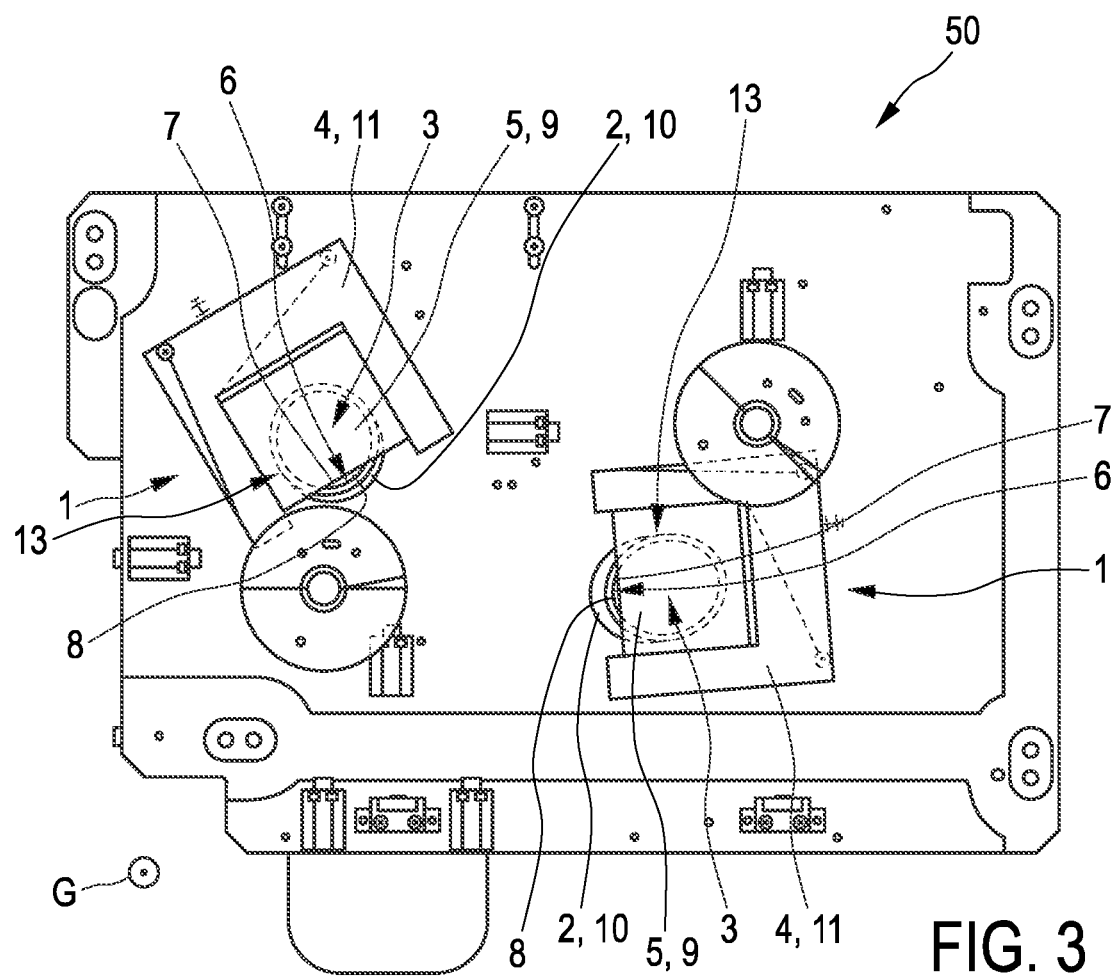
Figure 4:
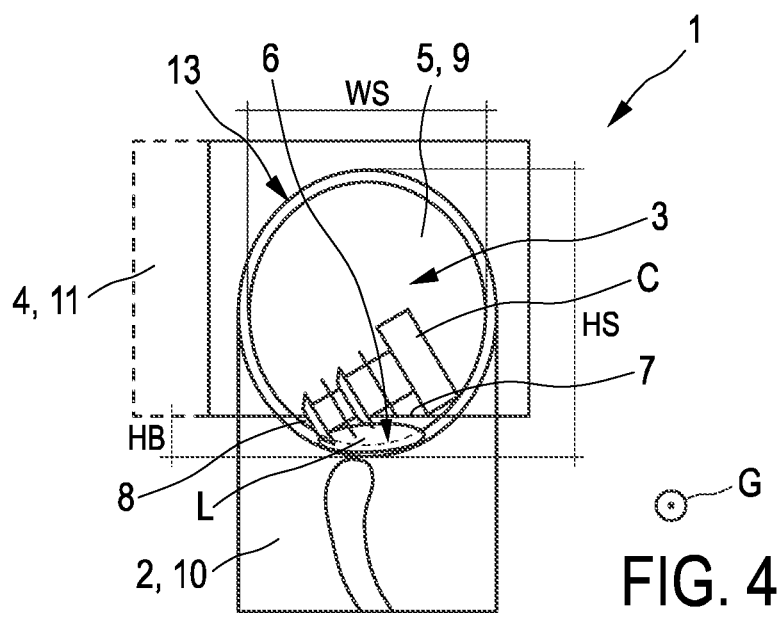

FIG. 1 schematically depicts, in a perspective view, an embodiment of a cap-removal apparatus according to the invention, the cap-removal apparatus having two exemplary chute arrangements according to the invention, FIG. 2 separately illustrates, in a perspective view, the chute arrangements of the cap-removal apparatus of FIG. 1, FIG. 3 illustrates, in a bottom view, the chute arrangements of FIG. 2, and FIG. 4 illustrates, in a bottom view, one of the chute arrangements of FIGS. 2 and 3 during operation.

A cap-removal apparatus 50 is adapted for removing caps C from sample containers. For example, the sample containers are laboratory sample containers. Such a laboratory sample container is typically embodied as a laboratory sample tube having a circular cross-section. The cap-removal apparatus 50 comprises at least one chute arrangement 1 according to the invention. In the example of the figures, the cap-removal apparatus 50 has two chute arrangements 1, both in accordance with the invention.

The chute arrangement 1 according to the invention has a chute 2. The chute 2 is adapted for transporting removed caps C through a transport space 3 of the chute arrangement 1. The chute arrangement 1 comprises a sensor 4 which is adapted for detecting caps C passing through a detection range 5 of the sensor 4. Therein, the transport space 3 is partially delimited by a chute bottom 6 of the chute 2. The chute bottom 6 is inclined with respect to gravity G, in particular so that caps C can slide along the chute bottom 6 and through the transport space 3 due to their own weight.

For example, the chute 2 comprises a tubular body 10. The tubular body 10 comprises the chute bottom 6 and at least partially surrounds the transport space 3. The tubular body 10 has a cross-sectional area of elliptical, for example lens-like or circular, shape.

The detection range 5 protrudes into the transport space 3. The detection range 5 has a range border 7 within the transport space 3. The range border 7 faces the chute bottom 6 at a distance. Due to the distance between the range border 7 and the chute bottom 6, a bypass portion 8 of the transport space 3 is formed in between the chute bottom 6 and the detection range 5. For example, the bypass portion 8 is adapted for liquid L led along the chute bottom 6 to bypass the detection range 5. Thus, said liquid L can be transported through the transport space 3 without intersecting the detection range 5. This allows for transporting liquid L through the transport space 3 without triggering the sensor 4.

For example, the detection range 5 comprises a substantially planar monitoring window 9. The substantially planar monitoring window 9 extends at an angle with respect to the chute bottom 6. In addition, or as an alternative, the substantially planar monitoring window 9 can extend at an angle with respect to gravity G. In the example of the figures, the substantially planar monitoring window 9 extends horizontally.

In the example of the figures, the bypass portion 8 has a bypass height HB. The bypass height HB is measured perpendicular to both the range border 7 and gravity G. The transport space 3 has a space height HS. The space height HS is measured along the bypass height HB. Therein, the bypass height HB is less than half of the space height HS. According to the figs., the bypass height HB is less than a tenth of the space height HS. The bypass height HB can be more than 4.0 mm and less than 5.0 mm.

For example, the sensor 4 has a retroreflective device or a fiber optic sender/receiver or a light barrier device 11. According to the figures, the sensor 4 has a light barrier device 11. Therein, in the example of the figures, the sensor 4 is arranged at an outlet 13 of the chute 2 so that the detection range 5 partially covers the outlet 13. For instance, the sensor 4 has a response time of max. 2.9 ms. In the embodiment depicted in the figures, the sensor 4 has a response time of max. 1.45 ms.

The cap-removal apparatus 50 has a handling device 51. The handling device 51 is adapted for taking caps C off sample containers and for delivering removed caps C to the inlet 12 of one of the two chutes 2 of the two chute arrangements 1, selectively. In the examples of the figures, the cap-removal apparatus 50 has two storage containers 52, each of which is assigned one of the chute arrangements 1, respectively. Such a storage container 52 is adapted for receiving caps C exiting the respective chute 2. Therein, the cap-removal apparatus 50 can have a common inlet-collector 53. The common inlet-collector 53 can be of a platter-shape. The inlet 12 of each chute 2 mouths into the common inlet-collector 53.

The cap-removal apparatus 50 can be part of a laboratory automation system. In addition to the cap-removal apparatus 50, the laboratory automation system can comprise at least one laboratory station, the laboratory station being functionally coupled to the cap-removal apparatus 50 and being adapted to automatically process/analyze samples. The at least one laboratory station can be a pre-analytical station, an analytical station, or a post-analytical station.

Pre-analytical stations may be adapted to perform any kind of pre-processing of samples, sample containers and/or sample container carriers. Analytical stations may be adapted to use a sample or part of the sample or a reagent to generate a measuring signal, the measuring signal indicating if and in which concentration, if any, an analyte is existing. Post-analytical stations may be adapted to perform any kind of post-processing of samples, sample containers and/or sample container carriers.

The pre-analytical, analytical and/or post-analytical stations may comprise at least one of a recapping station, an aliquot station, a centrifugation station, an archiving station, a pipetting station, a sorting station, a tube type identification station, a sample quality determining station, an add-on buffer station, a liquid level detection station, and a scaling/descaling station.

The handling device 51 can comprise a cap gripper. The cap gripper can be adapted to grip a cap C to be removed and to remove the cap C being gripped from the laboratory sample container. To remove the cap C, the cap gripper may apply any suitable force to the gripped cap C while the laboratory sample container is fixed. The sample container may be fixed by a container gripper of the cap-removal apparatus 50. The cap gripper may apply a rotational force and/or a transversal force to the cap C for a removal of the cap C.

The cap C typically comprises a cap head and a cap body, wherein the cap head has a larger diameter than the cap body. The cap head typically has a diameter larger than the diameter of the laboratory sample container and the cap body has a diameter corresponding to the diameter of the laboratory sample container.

Typically, the cap body is inserted into the laboratory sample container and the cap head is gripped by the cap gripper. Reference insofar is made to the relevant prior art.

The invention claimed is:

1. Chute arrangement for a cap removal apparatus, the cap removal apparatus being configured to remove caps from sample containers, the chute arrangement comprising:
    a chute for transporting removed caps through a transport space of the chute arrangement,
    a sensor for detecting caps passing through a detection range of the sensor,
    the transport space being partially delimited by a chute bottom of the chute,
    the chute bottom being inclined with respect to gravity,
    the detection range protruding into the transport space,
    the detection range having a range border within the transport space, and
    the range border facing the chute bottom at a distance so that a bypass portion of the transport space, in particular for liquid led along the chute bottom to bypass the detection range, is formed in between the chute bottom and the detection range.

2. Chute arrangement according to claim 1, characterized in that
    the detection range comprises a substantially planar monitoring window,
    the substantially planar monitoring window extending at an angle with respect to the chute bottom and/or with respect to gravity, in particular the substantially planar monitoring window extending horizontally.

3. Chute arrangement according to claim 1, characterized in that the chute has a tubular body comprising the chute bottom and at least partially surrounding the transport space, a cross sectional area of the tubular body being of elliptical, in particular lens-like or circular, shape.

4. Chute arrangement according to claim 1, characterized in that the sensor has a response time of max 2.9 ms, in particular of max 1.45 ms.

5. Chute arrangement according to claim 1, characterized in that the bypass portion has a bypass height measured perpendicular to both the range border and gravity,
    the transport space having a space height measured along the bypass height, the bypass height being less than half of, in particular less than a tenth of, the space height, in particular the bypass height being more than 4.0 mm and less than 5.0 mm.

6. Chute arrangement according to claim 1, characterized in that the sensor has a retroreflective device or a fiber optic sender/receiver or a light barrier device, and/or the sensor is arranged at an outlet of the chute so that the detection range partially covers the outlet.

7. Cap removal apparatus for removing caps from sample containers, the cap removal apparatus comprising
    at least one chute arrangement according to claim 1,
    a handling device for taking caps off sample containers and for delivering removed caps to an inlet of the chute of the chute arrangement,
    a storage container for receiving caps exiting the chute.

8. Cap removal apparatus according to claim 7, characterized in that
    the cap removal apparatus has two chute arrangements,
    the handling device being adapted to deliver removed caps to the inlet of one of the two chutes of the two chute arrangements, selectively, each of the chute arrangements being assigned a separate storage container of the cap removal apparatus, respectively, in particular the inlet of each chute mouthing into a common, in particular platter-shaped, inlet collector of the cap removal apparatus.

* * * * *